June 16, 1959    W. W. CUSHMAN    2,890,826
WEIGHT AND BALANCE COMPUTER FOR LOADING AIRCRAFT
Filed March 26, 1958
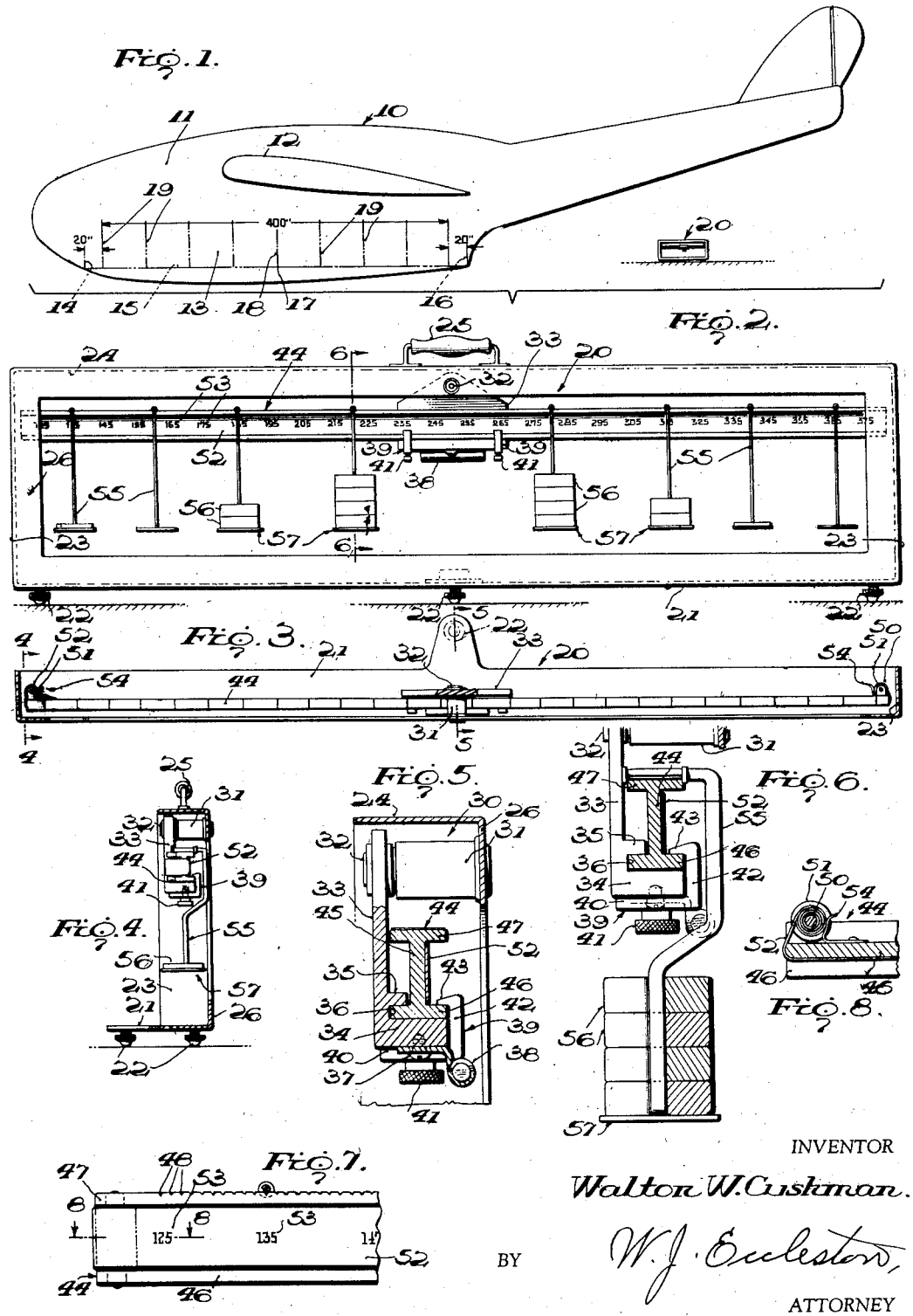
INVENTOR
Walton W. Cushman.
BY W. J. Eccleston,
ATTORNEY

United States Patent Office 2,890,826
Patented June 16, 1959

2,890,826

WEIGHT AND BALANCE COMPUTER FOR LOADING AIRCRAFT

Walton W. Cushman, Washington, D.C.

Application March 26, 1958, Serial No. 724,213

8 Claims. (Cl. 235—61)

(Granted under Title 35, U.S. Code (1952), sec. 266)

The invention described herein, if patented, may be manufactured and used by or for the Government for governmental purposes, wtihout the payment to me of any royalty thereon.

The invention relates to means for computing in advance the load and distribution of the same for a cargo aircraft. In loading aircraft, particularly aeroplanes, it is vital not only to hold the load within the load limits for the plane but also to so distribute the load relatively to the transverse center of lift of the plane that the maximum performance of the craft is achieved. Otherwise, the aircraft will be either nose heavy or tail heavy whereby to make it difficult or even dangerous to fly as well as inefficient in performance.

For instance, the present practice is to use arithmetical calculations which are relatively simple for a given loading arrangement known to be correct. However, such calculations are extremely painstaking and time consuming when an unknown loading arrangement is computed to determine the longitudinal center of gravity position and to provide necessary adjustments or re-arrangements of the cargo to insure that the center of gravity position will fall within safe flying limits. This is particularly important in the event of a partial power failure, e.g., failure of one of two engines, etc. It is possible and usual that computations to provide a total load center of gravity position within the prescribed limits may involve a large number of unsuccessful attempts using the principals of trial and error. It is emphasized that failure to load an aircraft within the prescribed fore and aft limitations of load center of gravity position can result in a forced landing in the event of a partial power failure wherein the available thrust remaining is insufficient to maintain altitude.

Devices analogous to the invention are known but are inadequate because they are not adaptable for use with all cargo aircraft and because they are not flexible enough to provide an arrangement wherein the center of gravity is moved as the load is increased. That is to say, for maximum efficiency, the load center must be moved toward the center of lift as the load is increased.

With the foregoing in view, it is an object of the invention to provide a novel device for computing in advance the total weight and distribution of the load for any aeroplane or the like.

A further object is to provide such a device which simulates the available cargo space on both sides of a selected transverse center of gravity or lift of any aircraft and provides for the simulated loading of any known aircraft while simultaneously maintaining the fore and aft equilibrium of the same.

Other objects and advantages reside in the particular structure of the invention, the structure of the several elements comprising the same, combinations and subcombinations of such elements, together with the particular method or mode of operation, all of which will be readily apparent to those skilled in the art upon reference to the drawing wherein one species of the invention is illustrated in connection with the following specification wherein the invention is described and claimed.

In the drawing:

Figure 1 is a composite diagrammatic view showing a scale comparison of a conventional aeroplane and the device according to the invention;

Figure 2 is an elevational view of a preferred embodiment of the invention;

Figure 3 is a plan view thereof, parts being shown in horizontal section.

Figure 4 is a vertical sectional view taken substantially on the plane of the line 4—4 of Figure 3;

Figure 5 is an enlarged, fragmentary, vertical sectional view taken substantially on the plane of the line 5—5 of Figure 3;

Figure 6 is an enlarged, fragmentary, vertical sectional view taken substantially on the plane of the line 6—6 of Figure 2;

Figure 7 is an enlarged, fragmentary elevational view of one end of the scale beam; and Figure 8 is a fragmentary horizontal sectional view taken substantially on the plane of the line 8—8 of Figure 7.

Referring specifically to the drawing wherein like reference characters designate like parts in all views, and referring at first to Figure 1, 10 designates generally and diagrammatically a typical cargo aeroplane which comprises a fuselage 11, wing 12 and a cargo compartment 13 which includes a front wall 14, a floor 15 and a rear wall 16. The normal transverse center of lift is indicated at 17 and in the aeroplane illustrated is centrally of the cargo compartment 13. Obviously, such center of lift position will be located elsewhere in other types of planes and under various load conditions. Lines 18 and 19 designate the centers of loading points and divide the cargo compartment into cargo areas. One line 18 is located on the designated center of lift 17. Units of a load are to be centered on points 18 and 19. It should be noted that the foremost and rearmost lines 19 or loading points are spaced from the front and rear walls of the cargo compartment distances equal to one half the distance between the intermediate lines 18 and 19. This permits an item of cargo to be centered on the front and rear loading points 19 without interference from the front and rear walls 14 and 16.

The embodiment of the invention here illustrated is shown to scale at the right of Figure 1 and comprises a balance which is generally designated by 20 and which is best seen in Figures 2–8 of the drawing now to be described.

In the form illustrated, the balance 20 comprises a base 21 having a plurality of feet 22 which may be adjustable vertically and individually by any suitable means to level the base 21. A bubble-type of level indicator or the like, not shown, may be mounted on the base 21. The base 21 is preferably formed with upstanding end walls 23 and a top wall 24, which may mount any suitable carrying handle 25. The front of the case thus formed may be partially closed by a frame 26 for supporting any suitable panel, transparent or otherwise, not shown, for closing the case when the device is not in use. Obviously, the case can assume other forms and embodiments.

The balance itself, comprises a fulcrum 30 which substantially spans the case in a rearward direction from the top portion of the frame 26 centrally of the case. Such fulcrum 30 may comprise a tubular housing 31 which is fixed to the frame portion 26. The housing 31 extends rearwardly and has journalled therein by any suitable antifriction means, not shown, a short shaft 32. A scale beam mount 33 is fixed to the shaft 32 and depends therefrom in the region of the rear end of the shaft. As best seen in Figures 5 and 6, the scale beam mount 33 is formed with a floor 34 and a superjacent rib 35 which is parallel to the floor in upwardly spaced relation thereto to provide a forwardly facing channel or groove 36 therebetween. The scale beam mount 33 has mounted thereon in any suitable manner as by one or more machine screws 37, a bubble-type leveling device 38 which is located to be read from the front. Also mounted on the floor 34, is any suitable clamping means such as a pair of clamps 39. Clamps 39 have bases 40 which are detachably secured to the under-surface of the floor 34 by thumbscrews 41. Each clamp 39 includes a leg 42 which extends upwardly of the floor 34 in front of the same and which terminates in a rearwardly directed clamping jaw 43 which overlies the floor 34 in spaced and opposed relation to the rib 35. The clamping jaws 43, or equivalent means, readily removably secure a scale beam 44, now to be described, to the floor 34 of the mount 33.

In the embodiment illustrated, the scale beam 44 comprises an I-beam which is disposed with its web 45 vertical and its bottom flange 46 horizontal so as to rest atop the floor 34 of the mount 33. The bottom flange 46 of beam 44 is sized to have a free sliding fit in the groove 36 formed by the rib 35 and the floor 34. The jaws 43 of the clamping means 39 overlie the front sections of the flange 46 and are actuated to clamp such flange to the floor 34 by the thumbscrews 41 in a manner readily understood. This arrangement permits the scale beam 44 to be shifted slightly to the right or left relative to the mount 33 to achieve a static balance when it is in the unloaded condition.

The upper surface of the top flange 47 of the scale beam 44 is formed with a plurality of transverse notches 48, Figure 7, each of which designates an "inch-station" in an aircraft cargo compartment. Aircraft cargo compartments are customarily divided into a plurality of cargo securing stations each of which is designated by the number of inches it is from a designated forward point in the aeroplane, not necessarily the forward wall of the cargo compartment. Thus, forward wall 14 of the cargo compartment 13, Figure 1, is located on, say the one hundred and twenty (120) inch station, while the designated center of lift 17 is located on the four hundred (400) inch station for the specific total load here considered. In aeroplanes other than that shown, it is understood that the front and rear walls 14 and 16 and centers of lift will be located on other inch-stations. Thus, known prior art devices having scale beams arranged for one type of aeroplane could not be used for calculating the cargo for another type of aeroplane. To cure this evil, the improvement now to be described has been devised.

As best seen in Figures 3 and 8, spools 50 are rotatably mounted by any suitable means such as the vertically spaced ears 51 at each end of the beam 44 rearwardly of each end of the same. A flexible tape 52 is mounted on the spools 50 and the forward face thereof is formed and provided with indicia 53 which in this instance designates inch-stations ten (10) inches apart. These indicia can be aligned with appropriate notches 48 on the beam 44. The arrangement is such that as the tape 52 is unrolled from one spool 50, it is rolled onto the other spool in a manner readily understood. Thus too, any inch-station on the tape 52 can be aligned with the center of balance of the beam 44. Then, the tape on either side of such center of balance designates those portions of the cargo compartment of an aeroplane the center of lift of which corresponds to that inch-station which has been aligned with the center of balance of the beam 44. The tape 52 is readily releasably secured in any selected position by any suitable securing means such as the friction brakes 54 one of which is shown in Figure 8. Such friction brakes 54 may comprise leaf springs which bear on those portions of the tape 52 which are wound around the spools 50 so as to retard but not actually prevent movement of the tape across the front of the beam 44.

When the tape 52 is arranged as described above, the operator notes the inch-stations which designate the endmost loading stations for the aeroplane in question and proceeds to simulate loading the same by applying the usual counterpoises 57 each comprising a hanger 55 bearing one or more weights 56 which are proportional in weight to the cargo items which are to be actually loaded. Clearly, if the operator achieves an imbalance when the entire simulated cargo has been loaded, it is a simple matter to rearrange the weighted counter-poises 57 until a balance has been achieved which is within the limits prescribed for the total weight involved. When this has been accomplished, it is a simple matter to load the cargo items which correspond to the weighted hangers 53 onto the aeroplane and secure them in centered relation on the proper inch-stations.

If the next aeroplane to be loaded is of a different type having its center of lift located on a different inch-station or if the weight and nature of the cargo to be loaded on the same type of aeroplane is such that it is desired to move the center of lift forwardly or rearwardly in the cargo compartment, the spools 50 are rotated until the desired inch-station 53 of the tape 52 is aligned with the center of balance of the beam 44. Thus, the single apparatus described above is capable of being used with all known aeroplanes and with a wide variety of loads.

Moreover, while there has been shown and described hereinabove what is now considered to be a preferred embodiment of the invention, it is understood that the same is susceptible of other forms and expressions. Consequently, the invention is not considered as being limited to the precise structure shown and described hereinabove but only as hereinafter claimed.

I claim:

1. In a balance computer for charting the locations of items of cargo in the cargo compartments of aircraft prior to loading the same, said computer including a base, a support pivotally mounted on said base and providing a fulcrum, a scale beam carried by said support, said scale beam being formed with longitudinally spaced stations corresponding to loading points in said cargo compartments, and a plurality of counterpoises each weighted to correspond to a cargo item and adapted to be supported on said beam at any of said stations; the improvement comprising a strip formed and provided with longitudinally spaced indicia designating loading points in the cargo compartments of known aircraft, means for adjusting said strip longitudinally of said beam, and means for securing said strip in any selected longitudinally adjusted position.

2. A computer according to claim 1, wherein said strip is flexible, and a take up roll for said strip carried by each end of said beam rearwardly thereof.

3. A computer according to claim 2, wherein said means for securing said strip in selected positions comprises brake means operatively associated with at least one of said take-up rolls.

4. A computer according to claim 3, wherein said brake means comprises a leaf spring frictionally engaged with one of said take-up rolls.

5. A computer according to claim 2, wherein said means for securing said strip in selected positions comprises spring loaded brake means operatively associated with at least one of said take-up rolls.

6. In a balance computer for charting the locations of items of cargo in the cargo compartments of aircraft prior to loading the same, said computer including a base, a support pivotally mounted on said base and providing a fulcrum and a scale beam carried by said support, said scale beam being formed with longitudinally spaced stations corresponding to longitudinally spaced loading points in said cargo compartments, and a plurality of counterpoises each weighted to correspond to a cargo item and adapted to be supported on said beam at any of said stations; the improvement comprising means mounting said scale beam on said support for longitudinal adjusting movement relative thereto, securing means securing said scale beam in any selected longitudinally adjusted position on said support whereby to vary the location of the center of balance of said beam relative to said fulcrum, a strip formed and provided with longitudinally spaced indicia designating loading points in the cargo compartments of known aircraft, means for adjusting said strip longitudinally of said beam, and means for securing said strip in any selected longitudinally adjusted position.

7. A computer according to claim 6, wherein said beam includes a bottom flange, said support including a floor slidably seating said flange, and adjustable clamp means for clamping said flange to said floor and comprising said securing means for securing said beam in selected longitudinally adjusted positions.

8. A computer according to claim 6, wherein said beam include front and rear bottom flanges, said support including a floor supporting said flanges, said support including a forwardly facing groove slidably receiving said rear flange therein, and adjustable clamp means for clamping said front flange to said floor and comprising said securing means for securing said beam in selected longitudinally adjusted positions.

References Cited in the file of this patent
UNITED STATES PATENTS

| | | |
|---|---|---|
| 119,871 | Marsh | Oct. 10, 1871 |
| 958,192 | Tate et al. | May 17, 1910 |
| 2,391,243 | Hutton | Dec. 18, 1945 |
| 2,391,257 | McWhorter | Dec. 18, 1945 |
| 2,459,554 | Tomko | Jan. 18, 1949 |